(12) United States Patent
Esaka et al.

(10) Patent No.: US 8,286,224 B2
(45) Date of Patent: Oct. 9, 2012

(54) AUTHENTICATION DEVICE AND NETWORK AUTHENTICATION SYSTEM, METHOD FOR AUTHENTICATING TERMINAL DEVICE AND PROGRAM STORAGE MEDIUM

(75) Inventors: Naoki Esaka, Yokohama (JP);
Yoshimichi Tanizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1007 days.

(21) Appl. No.: 12/188,262

(22) Filed: Aug. 8, 2008

(65) Prior Publication Data

US 2009/0064281 A1   Mar. 5, 2009

(30) Foreign Application Priority Data

Aug. 10, 2007   (JP) .................................. 2007-209652

(51) Int. Cl.
*H04L 9/32* (2006.01)
(52) U.S. Cl. ............ 726/3; 713/169; 713/170; 370/230; 380/247
(58) Field of Classification Search ........................ None
See application file for complete search history.

(56) References Cited

U.S. PATENT DOCUMENTS

| | | | | |
|---|---|---|---|---|
| 7,810,138 B2 * | 10/2010 | Vank et al. | ........................... | 726/4 |
| 7,934,094 B2 * | 4/2011 | Oyama | ........................... | 713/168 |
| 2007/0189218 A1 * | 8/2007 | Oba et al. | ........................... | 370/331 |
| 2009/0144807 A1 * | 6/2009 | Zheng | ............................... | 726/3 |
| 2011/0083168 A1 * | 4/2011 | Dutta et al. | ........................... | 726/4 |

FOREIGN PATENT DOCUMENTS

JP   2005-109823   4/2005

OTHER PUBLICATIONS

Forsberg et al., "Protocol for Carrying Authentication for Network Access (PANA)," Mar. 3, 2007, pp. 1-59.
Aboba et al., "Extensible Authentication Protocol (EAP)," Jul. 2004, pp. 1-68.
"Port-Based Network Access Control," IEEE Standard for Local and metropolitan area networks (Jun. 14, 2001), pp. 1-134.
Aboba et al., "The Network Access Identifier," Jan. 1999, pp. 1-9.

* cited by examiner

*Primary Examiner* — Fikremariam A Yalew
(74) *Attorney, Agent, or Firm* — Finnegan, Henderson, Farabow, Garrett & Dunner, L.L.P.

(57) ABSTRACT

When an authentication identifier is contained in a first message required for receiving authentication with respect to IEEE 802.1x from a terminal device, the authentication is assumed to be successful and then a data link is established with the terminal device, and a filtering unit is set so as to pass a first packet which should be passed for receiving authentication with respect to a higher layer protocol from among packets sent from the terminal device through the data link and to block a second packet different from the first packet. If a second message required for receiving authentication with respect to the higher layer protocol from the terminal device is received through the filtering unit, the authentication with respect to the higher layer protocol is performed. When the authentication is successful, the filtering unit is set so as to pass the second packet.

14 Claims, 4 Drawing Sheets

AUTHENTICATION DEVICE AND NETWORK AUTHENTICATION SYSTEM, METHOD FOR AUTHENTICATING TERMINAL DEVICE AND PROGRAM STORAGE MEDIUM

CROSS REFERENCE TO RELATED APPLICATIONS

This application is based upon and claims the benefit of priority from the prior Japanese Patent Applications No. 2007-209652, filed on Aug. 10, 2007; the entire contents of which are incorporated herein by reference.

BACKGROUND OF THE INVENTION

1. Field of the Invention

The present invention relates to an authentication device and a network authentication system, a method for authenticating a terminal device and a program storage medium.

2. Related Art

As a network access authentication protocol, IEEE 802.1X (see IEEE802. IEEE-Std802.1X-2001, 2001. http://standards.ieee.org/getieee802/download/802.1X2001.pdf) is widely prevalent. However, since IEEE 802.1X is a link layer protocol and directed only to Ethernet, there is a problem that it cannot support various data link layers. To solve this problem, in IETF, PANA (Protocol for Carrying Authentication For Network Access) (see Dan Forsberg. Protocol for Carrying Authentication for Network Access (PANA). Internet Draft, March 2007. <draft-letf-pana-pana-14.txt>) has been proposed/standardized. PANA is a network access authentication protocol that operates on UDP(User Datagram Protocol)/IP(Internet Protocol).

When the PANA is introduced as a network access authentication protocol into a network in which IEEE 802.1X has already been operated, it is desirable that the network be smoothly shifted to a state where the PANA and IEEE 802.1X coexist. Even if the IEEE 802.1X and PANA coexist, each exists independently in a sub-layer and therefore they do not disturb each other. However, in a system where authentication is performed with respect to PANA in addition to IEEE 802.1X (in a case where a network of the IEEE 802.1X has already been built and additionally a device which requires PANA is introduced while the IEEE 802.1X is being kept), a terminal device needs authentication for an authentication server (AAA) multiple times in conformity to both of IEEE 802.1X and PANA. Therefore, there is a problem that a time at which service of the terminal device can start is delayed. In addition, the load on the authentication server is increased because authentication request to the server occurs multiple times.

FIG. 4 generally shows a procedure in which a terminal device supporting both of IEEE 802.1X and PANA receives authentication by EAP (Extensible Authentication Protocol) (EAP authentication) as an authentication protocol in a system where IEEE 802.1X and PANA are simultaneously in operation.

As understood from FIG. 4, this terminal device receives EAP authentication 101 by IEEE 802.1X and then receives EAP authentication 102 by PANA. Since two types of authentication are needed on IEEE 802.1X and PANA respectively until the terminal device is allowed to use service as described above, a time at which the terminal device can start service is delayed as well as the load on the authentication server is increased.

Therefore, when PANA is introduced into a network in which IEEE 802.1X has already been prevailing, it is desirable that:

in the terminal device supporting IEEE 802.1X and PANA, the time taken for authentication of the terminal device be reduced; and operations of a terminal device and a device which supports only IEEE 802.1X be not affected.

SUMMARY OF THE INVENTION

According to an aspect of the present invention, there is provided with an authentication device for authenticating a terminal device which receives authentication according to a certain authentication protocol with respect to both an IEEE 802.1X that is defined in a data link layer in a protocol stack and a higher layer protocol that is defined in a higher layer than a UDP(User Datagram Protocol)/IP(Internet Protocol) layer or a TCP(Transmission Control Protocol)/IP(Internet Protocol) layer in the protocol stack, the certain authentication protocol being operable on both of the IEEE 802.1X and the higher layer protocol, the authentication device comprising:

a first acquisition unit configured to acquire a first message required for receiving authentication with respect to the IEEE 802.1X, from the terminal device;

a sending-back unit configured to send-back a success message to notify that the authentication with respect to the IEEE 802.1X is successful to the terminal device when a predetermined authentication identifier is contained in the first message;

a data link establishing unit configured to establish a data link of the data link layer with the terminal device to which the success message have been sent-back;

a filtering unit configured to perform filtering on packets of the UDP/IP or the TCP/IP that is sent from the terminal device through the data link;

a first fitter setting unit configured to set the filtering unit so as to pass a first packet which should be passed for receiving authentication with respect to the higher layer protocol from among the packets sent from the terminal device and to block a second packet different from the first packet, when the authentication identifier is contained in the first message;

a second acquisition unit configured to acquire a second message carried by the first packet through the filtering unit from the terminal device, the second message being required for receiving authentication with respect to the higher layer protocol;

an authentication unit configured to authenticate the terminal device which has sent the second message with respect to the higher layer protocol; and a second filter setting unit configured to set the filtering unit so as to pass the second packet sent from the terminal device through the data link when the authentication with respect to the higher layer protocol is successful.

According to an aspect of the present invention, there is provided with an authentication method for authenticating a terminal device which receives authentication according to a certain authentication protocol with respect to both an IEEE 802.1X that is defined in a data link layer in a protocol stack and a higher layer protocol that is defined in a higher layer than a UDP/IP layer or a TC/IP layer in the protocol stack, the certain authentication protocol being operable on both of the IEEE 802.1X and the higher layer protocol, the method comprising:

acquiring a first message required for receiving authentication with respect to the IEEE 802.1X, from the terminal device;

when a predetermined authentication identifier is contained in the first message acquired from the terminal device, sending-back a success message to notify that the authentication with respect to the IEEE 802.1X is successful to the terminal device;

establishing a data link of the data link layer with the terminal device to which the success message have been sent-back;

filtering packets of the UDP/IP or the TCP/IP that is sent from the terminal device through the data link, using a filtering unit which filters the packets;

when the authentication identifier is contained in the first message, setting the filtering unit so as to pass a first packet which should be passed for receiving authentication with respect to the higher layer protocol from among the packets sent from the terminal device and to block a second packet different from the first packet;

acquiring a second message carried by the first packet by the filtering unit from the terminal device, the second message being required for receiving authentication with respect to the higher layer protocol;

authenticating the terminal device which has sent the second message with respect to the higher layer protocol; and when the authentication with respect to the higher layer protocol is successful, setting the filtering unit so as to pass the second packet sent from the terminal device through the data link.

According to an aspect of the present invention, there is provided with a program storage medium storing an authentication program for authenticating a terminal device which receives authentication according to a certain authentication protocol with respect to both an IEEE 802.1X that is defined in a data link layer in a protocol stack and a higher layer protocol that is defined in a higher layer than a UDP/IP layer or a TCP/IP layer in the protocol stack, the certain authentication protocol being operable on both of the IEEE 802.1X and the higher layer protocol, the program causing a computer to execute the steps of:

acquiring a first message required for receiving authentication with respect to the IEEE 802.1X, from the terminal device;

when a predetermined authentication Identifier is contained in the first message acquired from the terminal device, sending-back a success message to notify that the authentication with respect to the IEEE 802.1X is successful to the terminal device;

establishing a data link of the data link layer with the terminal device to which the success message have been sent-back;

filtering packets of the UDP/IP or the TCP/IP that is sent from the terminal device through the data link, using a filtering unit which filters the packets;

when the authentication identifier is contained in the first message, setting the filtering unit so as to pass a first packet which should be passed for receiving authentication with respect to the higher layer protocol from among the packets sent from the terminal device and to block a second packet different from the first packet;

acquiring a second message carried by the first packet by the filtering unit from the terminal device, the second message being required for receiving authentication with respect to the higher layer protocol;

authenticating the terminal device which has sent the second message with respect to the higher layer protocol; and when the authentication with respect to the higher layer protocol is successful, setting the filtering unit so as to pass the second packet sent from the terminal device through the data link.

According to an aspect of the present invention, there is provided with a network access authentication system having a terminal device which receives authentication according to a certain authentication protocol with respect to both an IEEE 802.1X that is defined in a data link layer in a protocol stack and a higher layer protocol that is defined in a higher layer than a UDP/IP layer or a TCP/IP layer in the protocol stack, and an authentication device which authenticates the terminal device, the certain authentication protocol being operable on both of the IEEE 802.1X and the higher layer protocol, the authentication device comprising:

a first acquisition unit configured to acquire a first message required for receiving authentication with respect to the IEEE 802.1X, from the terminal device;

a sending-back unit configured to send-back a success message to notify that the authentication with respect to the IEEE 802.1X is successful to the terminal device when a predetermined authentication identifier is contained in the first message;

a data link establishing unit configured to establish a data link of the data link layer with the terminal device which the success message have been sent-back;

a filtering unit configured to perform filtering on packets of the UDP/IP or the TCP/IP that is sent from the terminal device through the data link;

a first filter setting unit configured to set the filtering unit so as to pass a first packet which should be passed for receiving authentication with respect to the higher layer protocol from among the packets sent from the terminal device and to block a second packet different from the first packet, when the authentication identifier is contained in the first message;

a second acquisition unit configured to acquire a second message carried by the first packet through the filtering unit, the second message being required for receiving authentication with respect to the higher layer protocol from the terminal device;

an authentication unit configured to authenticate the terminal device which has sent the second message with respect to the higher layer protocol; and a second filter setting unit configured to set the filtering unit so as to pass the second packet sent from the terminal device through the data link when the authentication with respect to the higher layer protocol is successful, the terminal device comprising:

a transmitting unit configured to transmit the first message required for receiving the authentication with respect to the IEEE 802.1X including the predetermined authentication identifier to the authentication device.

DETAILED DESCRIPTION OF THE INVENTION

One of the major characteristics of the present embodiment is that, in the case where PANA is introduced into a network in which IEEE 802.1X has already been built, when a terminal device supporting both of IEEE 802.1X and PANA requests network access authentication from an authentication agent device (authentication device), the authentication agent device performs, with respect to IEEE 802.1X authentication, processing for assuming the IEEE 802.1X authentication to be successful without violating specifications of the sequence of IEEE 802.1X and without inquiring at an authentication server, and then performs authentication actually with respect to only PANA. In the present embodiment, it is assumed that PANA is introduced into a network in which IEEE 802.1X has already been built. Therefore, as terminal devices participating in the network, two kinds of terminal devices: a terminal device supporting only IEEE 802.1X and a terminal device supporting both of IEEE 802.1X and PANA are assumed, and a terminal device supporting only PANA is not supposed.

Hereinafter, an embodiment of the present invention will be described in detail with reference to the drawings.

Figure 1:
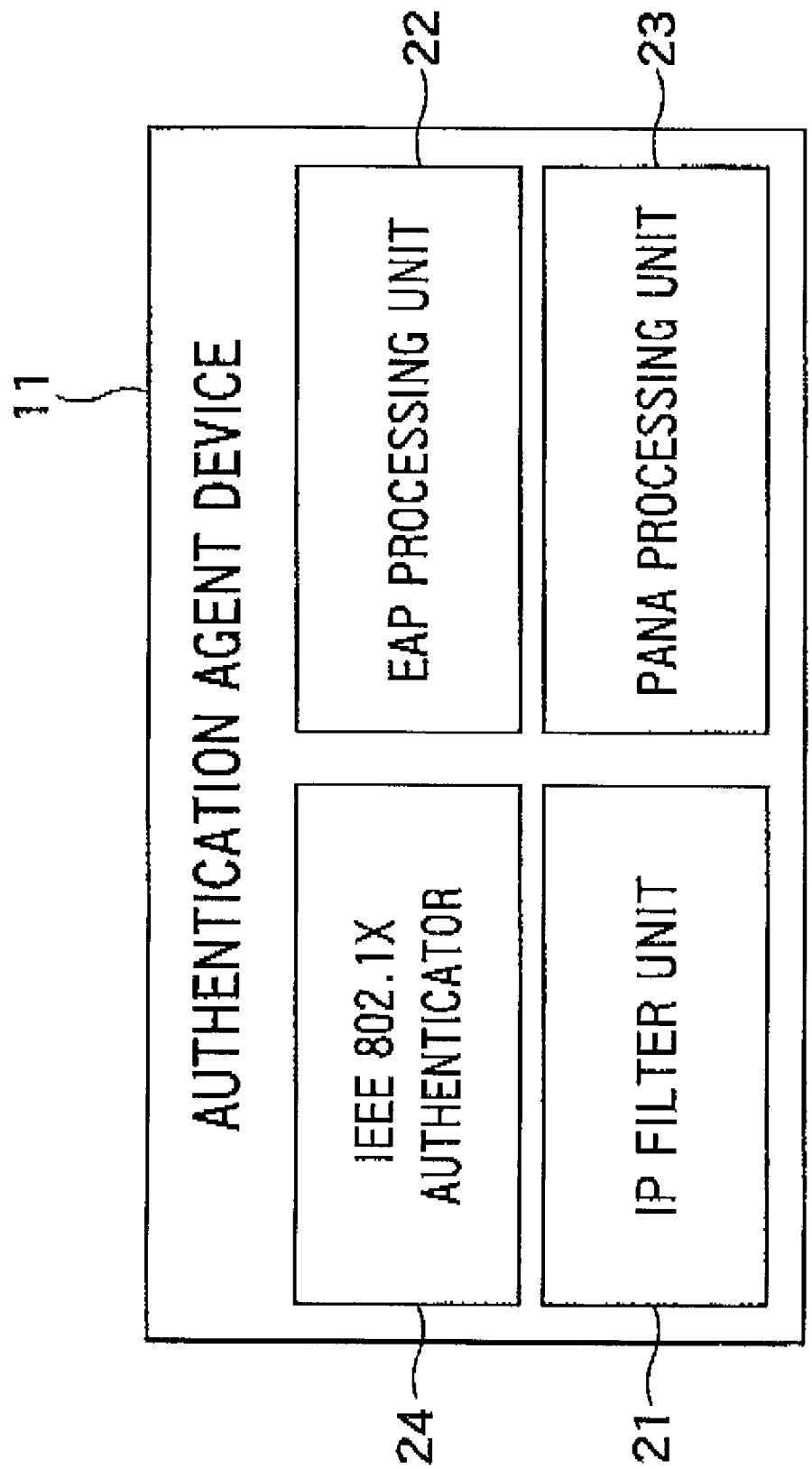
FIG. 1 is a block diagram which shows a configuration of an authentication agent device as one embodiment of the present invention.
Figure 2:
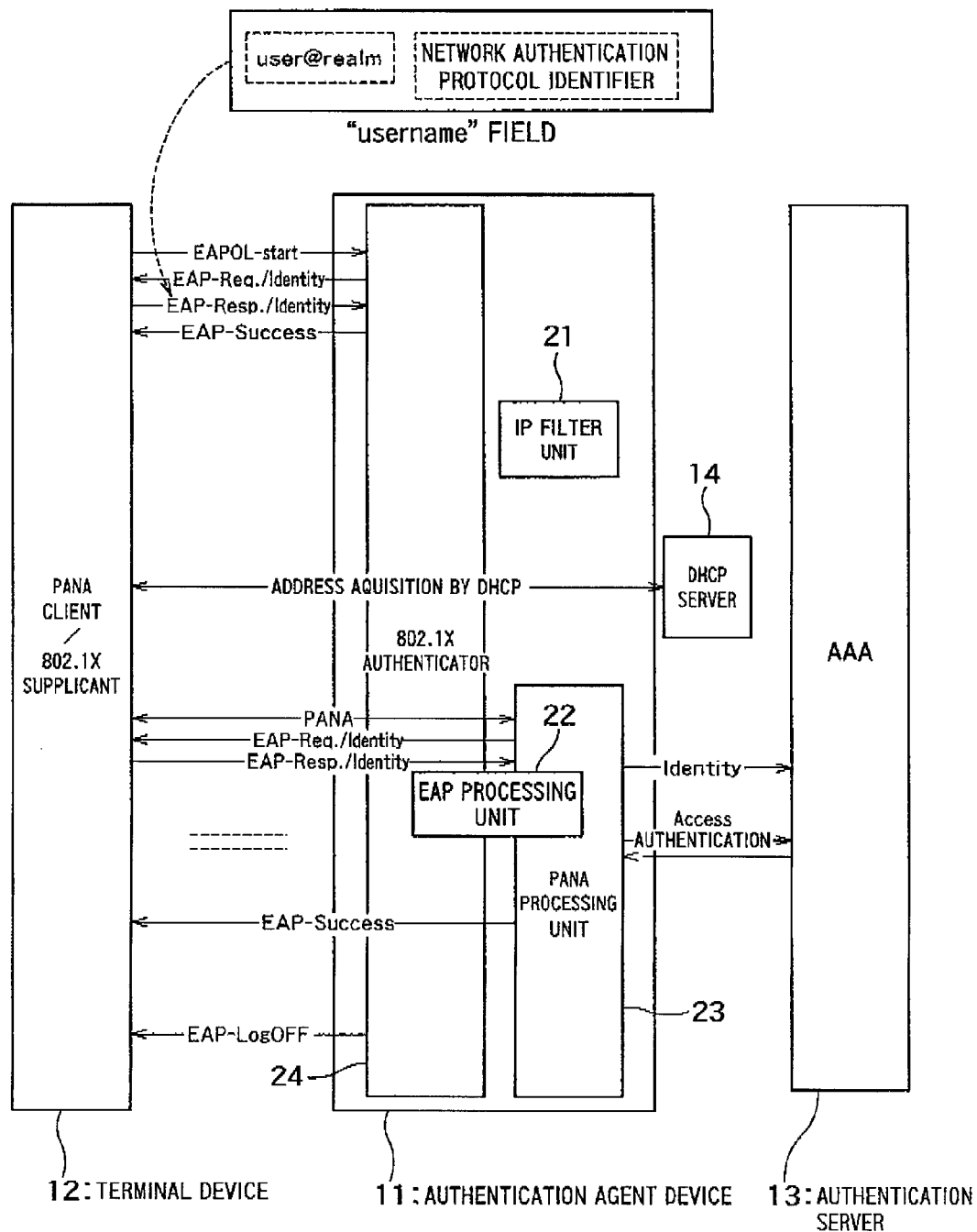
FIG. 2 is a diagram which shows an example of a network authentication system to which the authentication agent of FIG. 1 is applied.

FIG. 1 is a block diagram which shows a configuration of an authentication agent device (authentication device) 11 as one embodiment of the present invention. FIG. 2 is a diagram which shows a schematic configuration of a network authentication system to which the authentication agent device of FIG. 1 is applied.

Figure 4:
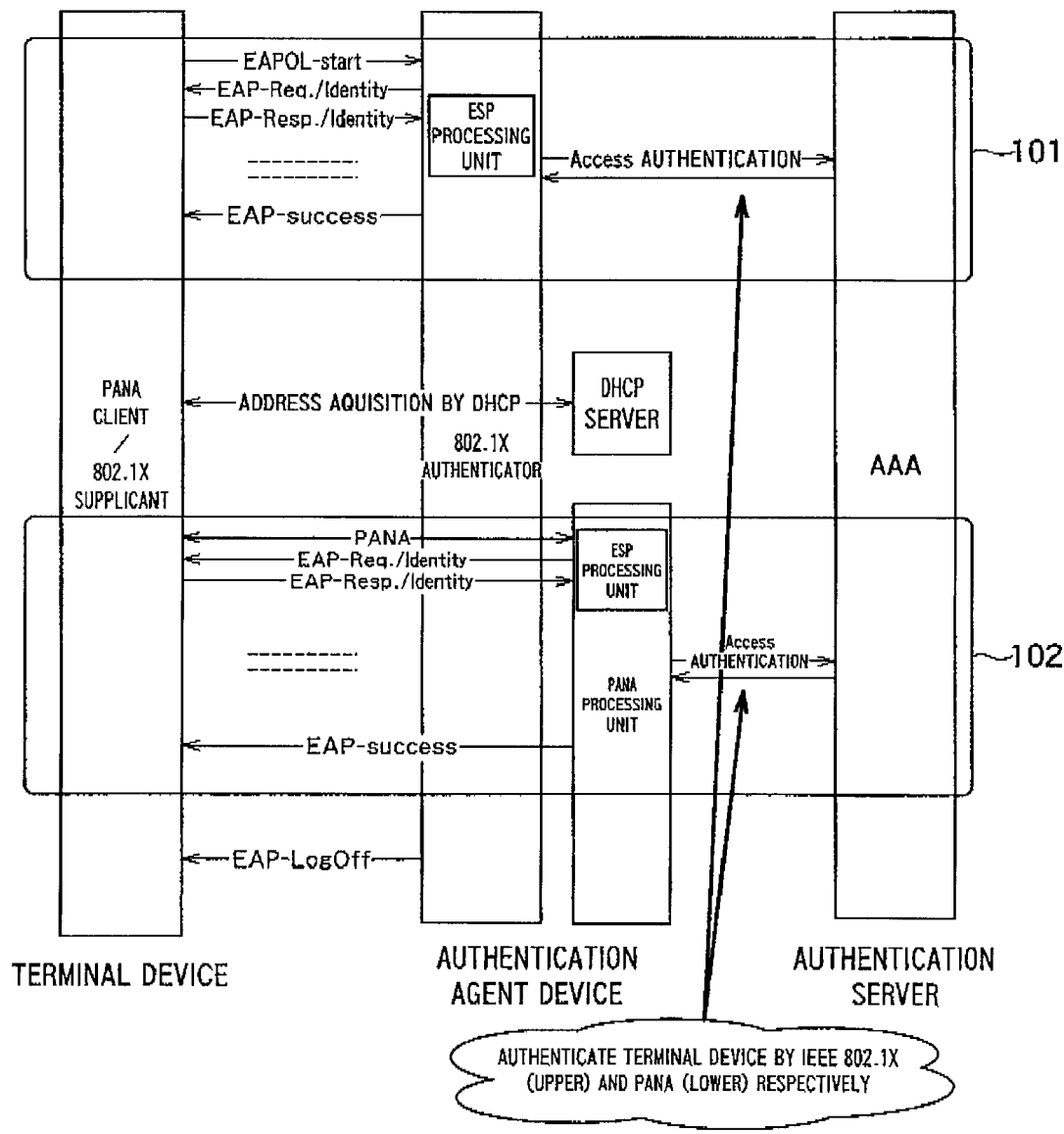
FIG. 4 is a diagram which shows an example of a conventional network authentication system in which IEEE 802.1X and PANA are simultaneously in operation.

As shown in FIG. 2, in the present network authentication system, when a terminal device 12 supporting both of IEEE 802.1X and PANA requests network access authentication from the authentication agent device 11, the authentication agent device 11 performs, with respect to IEEE 802.1X authentication, processing for assuming the IEEE 802.1X authentication to be successful without violating specifications of the sequence of IEEE 802.1X and without inquiring at an authentication server 13, and then the authentication agent device 11 performs network access authentication with respect to PANA by accessing the authentication server 13. Thus, as understood from FIG. 2, this system is significantly different from a conventional system shown In FIG. 4 in that IEEE 802.1X authentication is not performed in effect. Accordingly, in the present system, the number of times of authentication can be reduced to one in effect while conventionally the number of times of authentication is two, so that the time required for authentication can be significantly reduced.

Hereinafter, an embodiment of the authentication agent device, which is one of the major characteristics of the present invention, will be described in detail in the network authentication system as described above. Then, operation of the network authentication system will be schematically described with reference to FIG. 2, and the operation of the system will be described in detail with reference to FIG. 3.

As shown in FIG. 1, the authentication agent device 11 includes an IP (Internet Protocol) filter unit 21, an EAP (Extensible Authentication protocol) processing unit 22, a PANA (Protocol for Carrying Authentication for Network Access) processing unit 23, and an IEEE 802.1X authenticator 24.

[IP Filter Unit 21]

The IP filter unit 21 has an IP filtering function which filters packets such as a TCP(Transmission Control Protocol)/IP (Internet Protocol) packet or a UDP(User Datagram Protocol)/IP(Internet Protocol) packet, and, for example, which filters packets on the basis of port or IP address. In the present embodiment, the IP filter unit 21 controls passing and blocking of a packet having a port/protocol specified by the EAP processing unit 22 and the PANA processing unit 23. More specifically, the IP filter unit 21 determines based on a filter setting whether or not to pass a packet sent from the terminal device. Then, If the packet is determined to be passed, the IP filter unit 21 passes the packet to an application or a block according to its filter setting, and if the packet is determined not to be passed, the IP filter unit 21 drops the packet or returns an error message. For example, when passing a packet associated with PANA (a first packet), the IP filter unit 21 passes it to the PANA processing unit (PANA application) 23. When passing a packet of network access to the Internet or the like (a second packet), the IP filter unit 21 passes it to a not-shown transmission unit (transmission block) which performs packet transmission to the Internet.

In this case, PANA corresponds to a higher layer protocol defined in a higher layer than the TCP/IP layer or UDP/IP layer in the protocol stack, and IEEE 802.1X is one defined in the data link layer lower than the TCP/IP layer or UDP/IP. EAP corresponds to a certain authentication protocol operable on both of IEEE 802.1X and the higher layer protocol.

[IEEE 802.1X Authenticator 24]

The IEEE 802.1X authenticator 24 retains either a "forceAuthorized" state or an "auto" state for each terminal devices and setting of state can be changed by an instruction from the EAP processing unit 22.

In the "auto" state, when the IEEE 802.1X authenticator 24 receives a frame containing an authentication request (for example, an "EAP-Response/identity" corresponding to a first message) from a terminal device, the authenticator acquires the authentication request from the received frame and passes it to the EAP processing unit 22. Based on this authentication request, the EAP processing unit 22 determines to perform IEEE 802.1X authentication (EAP authentication performed on IEEE 802.1X) according to a conventional procedure, or sets the IEEE 802.1X authenticator 24 to the "forceAuthorized" state.

When the EAP processing unit 22 determines to perform IEEE 802.1X authentication, the IEEE 802.1X authenticator 24 performs authentication using the authentication server 13 in cooperation with the EAP processing unit 22 as in a conventional manner. Then, if authentication of the terminal device is allowed, the IEEE 802.1X authenticator 24 receives an "EAP Success" message (success message) indicating that the IEEE 802.1X authentication (EAP authentication performed on IEEE 802.1X) is allowed from the EAP processing unit 22 and sends back the message to the terminal device. From then on, the IEEE 802.1X authenticator 24 passes a frame sent from the terminal device (i.e., establishes a data link of the data link layer with the terminal device), and the passed frame is passed to, for example, the IP filter unit 21. If the authentication of the terminal device is not allowed, the IEEE 802.1X authenticator 24 does not pass a frame ahead of itself from then on even if the packet is sent from the terminal device. (However, if a frame containing an authentication request is received, the authenticator performs the same processing as described above.)

On the other hand, if the IEEE 802.1X authenticator 24 is set to the "forceAuthorized" state by the EAP processing unit 22, the authenticator receives an "EAP Success" message (success message) notifying that the authentication is allowed from the EAP processing unit 22 and sends back the message to the terminal device without performing IEEE 802.1X authentication. From then on, the IEEE 802.1X authenticator 24 passes a frame sent from the terminal device (i.e., establishes a data link of the data link layer with the terminal device). The IEEE 802.1X authenticator 24 includes, for example, a first acquisition unit, a sending-back unit, and a data link establishing unit.

[EAP Processing Unit 22]

The EAP processing unit 22 performs conventional EAP processing. Further, when the EAP processing unit 22 receives an authentication request sent from the terminal device, that is, the "EAP-Response/Identity" message (first message), from the IEEE 802.1X authenticator 24, the EAP processing unit 22 determines whether or not a predetermined network authentication protocol identifier (PID) is contained in a "username" field of the message aside from a normal "username" ("user@realm" in FIG. 2). The network authentication protocol identifier indicates request for authentication according to the present invention. The network authentication protocol identifier corresponds to, for example, an authentication identifier.

In the format of "username" field, the network authentication protocol identifier is described in accordance with EAP Identity (see B. Aboda, L. Blunk, J. Volibrecht, J. Carlson, H. Levkow etz, and Ed. Extensible Authentication Protocol (EAP). rfc 3748, IETF, June 2004), NAI (see B. Aboda and M. Beadles. The Network Access Identifier rfc 2486, IETF, January 1999), and IEEE 802.1X (see IEEE802. IEEE-Std802.1X-2001, 2001. http://standards.ieee.org/getieee802/download/802.1X2001.pdf), so that the conventional IEEE 802.1X authenticator which performs only IEEE 802.1X authentication is not affected. However, even if an "EAP-Response/Identity" message containing a network authentication protocol identifier is sent to the conventional IEEE 802.1X authenticator, IEEE 802.1X authentication is not successful. Therefore, in this case, the terminal device needs to send the message whose network authentication protocol identifier is removed from the "username" field (i.e., containing only the "user@realm") to receive IEEE 802.1X authentication, and then further needs authentication with respect to PANA (thus, the terminal device has to receive authentication twice).

When a network authentication protocol identifier is contained in the "username" field of the "EAP-Response/Identity" message, the EAP processing unit 22 performs processing according to the steps 1 to 4 as follows;

1. For PANA authentication (EAP authentication performed on PANA), the EAP processing unit 22 notifies the PANA processing unit 23 of the "username" (i.e., "user@realm") and network authentication protocol identifier contained in the "username" field,
2. The EAP processing unit 22 instructs the IP filter unit 21 to perform filter setting so as to pass only a packet of a port/protocol previously associated with the network authentication protocol identifier (a first packet) (the IP filter unit 21 is caused to perform "filter setting associated with the network authentication protocol identifier"). In other words, the IP filter unit 21 is instructed to pass only a packet of the port/protocol required for receiving PANA authentication (first packet).
3. The EAP processing unit 22 changes the state of the IEEE 802.1X authenticator 24 to the "forceAuthorized" state.

If any of the above steps 1 to 3 fails, the same processing is performed as in the case where no network authentication protocol identifier is contained in the "username" field of the "EAP-Response/Identity" message as described later. On this occasion, an already successful processing step is cancelled from among the steps 1 to 3.

When the PANA processing unit 23 notifies the EAP processing unit 22 that authentication of "username" (PANA authentication to be described later) is disabled, the EAP processing unit 22 cancels the processing of steps 2 and 3, and further sends an "EAP Logoff" message indicating log-off from EAP-authorized state through the IEEE 802.1X authenticator 24 to the terminal device.

4. If all of the above steps 1 to 3 are successful, the EAP processing unit 22 sends an "EAP Success" message (success message) indicating that EAP authentication is successful on IEEE 802.1X through the IEEE 802.1X authenticator 24 to the terminal device.

On the other hand, no network authentication protocol identifier is contained in the "username" field of the "EAP-Response/Identity" message, the EAP processing unit 22 performs normal EAP authentication on IEEE 802.1X (IEEE 802.1X authentication) with respect to the "username" (i.e., "user@realm") contained in the "username" field. In this authentication, the above described "EAP-Response/Identity" message is sent to, for example, an authentication server derived from the "username". A function corresponding to the authentication server may be included in the authentication agent device 11, and in this case, EAP authentication is performed using this function.

The above described EAP processing unit 22 corresponds to, for example, the authentication unit and the first filter setting unit.

[PANA Processing Unit 23]

The PANA processing unit 23 processes a message of PANA. The PANA processing unit 23 checks whether or not a "username" notified from the EAP processing unit 22 matches a "username" (i.e., "user@realm") contained in the "username" field of an "EAP-Response/Identity" (second message) sent from a terminal device attempting to receive PANA authentication (EAP authentication on PANA) (which has already received force authorization or normal authorization on IEEE 802.1X).

When force authorization of IEEE 802.1X is performed as described above, filter setting has been made in the IP filter unit 21 so as to pass only a packet of a port/protocol previously associated with the network authentication protocol identifier (first packet) (when normal authorization of IEEE 802.1X is performed, the IP filter unit 21 passes basically all the packets (first packet and second packet) according to a default filter setting.). The above described "EAP-Response/Identity" (second message) is carried by the first packet. The PANA processing unit 23 receives the first packet through the IP filter unit 21 and acquires the "EAP-Response/Identity" (second message) from the received first packet.

If the "username" contained in the "username" field of the "EAP-Response/Identity" (second message) does not match the "username" notified from the EAP processing unit 22, the PANA processing unit 23 performs the normal PANA processing. As example of the case where they are not matched is the case where EAP authentication is performed with respect to IEEE 802.1X and PANA using different "username"s. In this case, the terminal device receives normal IEEE 802.1X authentication without sending a network authentication protocol identifier. Therefore, this terminal device receives IEEE 802.1X authentication and PANA authentication separately as in a conventional manner.

On the other hand, if the "username" contained in the "username" field of the "EAP-Response/Identity" does matches the "username" notified from the EAP processing unit 22, the PANA processing unit 23 performs the following processing in addition to the normal PANA processing.

When authentication of the "username" is successful in the normal PANA processing, the PANA processing unit 23 instructs the IP filter unit 21 to perform filter setting so as to pass a packet of a port/protocol of service associated with the "username" (second packet) (it causes the IP filter unit 21 to perform "filter setting associated with the "Identity" "). In other words, the IP filter unit 21 is instructed to pass a packet (second packet) which is sent after the successful authentication from a terminal device having the "username" that has been successful in PANA authentication.

If the authentication of the "username" fails in the normal PANA processing, or if an authentication request (the second message) for the "username" does not arrive for a certain period (Timeout), or if PANA authentication (EAP authentication on PANA) is terminated (termination), the PANA processing unit 23 performs the following processing:

1. The PANA processing unit 23 notifies the EAP processing unit 22 that authorization of the "username" is disabled, and causes the EAP processing unit 22 to erase data regarding the "username". For example, the processing steps 2 and 3 of the EAP processing unit 22 are cancelled.
2. The PANA processing unit 23 instructs the IP filter unit 21 to block a packet of a port/protocol of service associated with the "username" (second packet) (it causes the IP filter unit 21 to cancel "the filter setting associated with the "Identity" ").

The above described PANA processing unit 23 corresponds to, for example, a second acquisition unit and a second filter setting unit.

Hereinafter, operation of the network access authentication system according to the present embodiment will be schematically described with reference to FIG. 2, and then the operation of the system will be described in detail with reference to FIG. 3.

As shown in FIG. 2, in the network access authentication system according to the present embodiment, when the terminal device 12 supporting both of IEEE 802.1X and PANA is authenticated, IEEE 802.1X authentication is assumed to be successful without inquiring at the authentication server 13, and only PANA authentication is performed after that. For omitting IEEE 802.1X authentication and receiving only the PANA authentication, the terminal device 12 contains a network authentication protocol identifier in the "username" field of the "EAP-Response/Identity" in addition to the normal "username" (i.e., "user@ realm") to send the "EAP-Response/Identity". At this point, the network authentication protocol identifier is not contained in an "EAPOL-start" because the "EAPOL-start" has no room for extension, and if it is contained here, a device supporting only IEEE 802.1X cannot be handled.

After the success of the IEEE 802.1X authentication, the terminal device 12 acquires an IP address according to DHCP (Dynamic Host Configuration Protocol), and further receives PANA authentication. A port for the IP address acquisition and PANA authentication according to the DHCP is made by the IP filter unit 21. A port is just opened/closed in the normal IEEE 802.1X. However, the filter unit 21 is requested to perform filter setting for passing a packet of a higher layer protocol (In this instance, PANA) so that communications of only DHCP and PANA are allowed, and after the PANA authentication is enabled, filter setting of the IP filter unit 21 is made so as to pass a packet for another communication (for example, access to the Internet).

Figure 3:
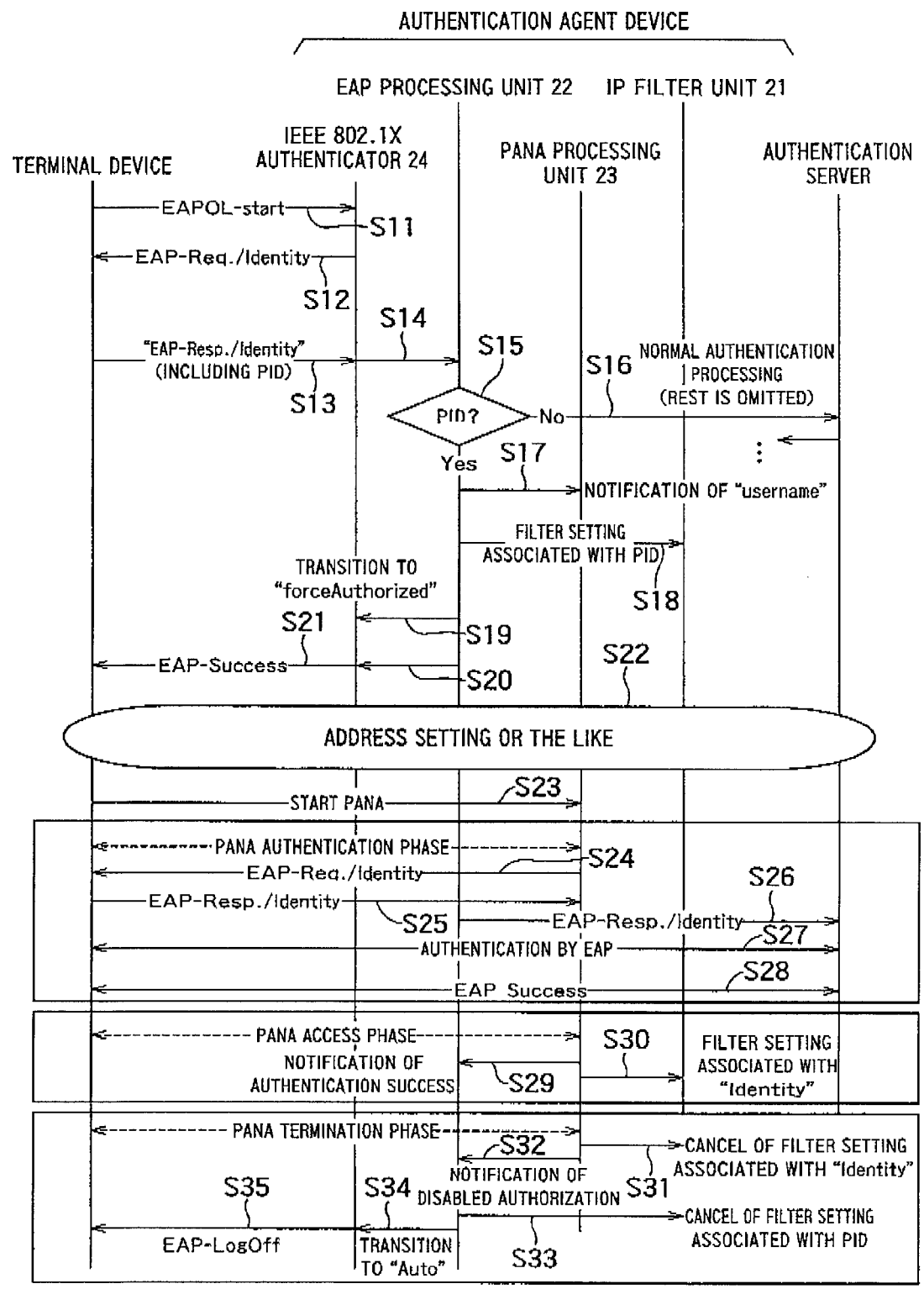
FIG. 3 is a diagram which shows an operation example of the network authentication system of FIG. 2.

FIG. 3 is a flowchart which illustrates the detailed operation of the network authentication system of FIG. 2.

(1) The terminal device sends "EAPOL-start" ("EAPOL-start" is sent in the normal IEEE 802.1X procedure) to start IEEE 802.1X (S11). S11 may be skipped.
(2) The IEEE 802.1X authenticator 24 in the authentication agent device sends an "EAP-Request/Identity" according to the procedure of EAP (S12). The "EAP-Request/Identity" is a message requesting to send an "Identity" of the terminal device for authenticating the terminal device.
(3) The terminal device returns the "EAP-Response/Identity" (first message) to the authentication agent device according to the procedure of EAP (S13). When the terminal device uses PANA as an authentication unit, a network authentication protocol identifier (referred to as "PID" in FIG. 3) is described in the "username" field of the "Identity" in addition to the normal "username" (see "user@realm" in FIG. 2), and an "EAPOL" frame is sent. The terminal device has a transmitting unit configured to transmit the first message including a network authentication protocol identifier (authentication identifier) to the authentication agent device.
(4) The IEEE 802.1X authenticator 24 receives the "EAPOL" frame, extracts the "EAP-Response/Identity" from the frame, and passes it to the EAP processing unit 22 according to the normal IEEE 802.1X procedure (S14).
(5) The EAP processing unit 22 checks whether or not a network authentication protocol identifier (PID) is contained in the "username" field of the "Identity" based on the "EAP-Response/Identity" acquired from the IEEE 802.1X authenticator 24 (S15). If it is not contained (NO), the conventional EAP authentication is performed (S16). This is an operation required for the terminal device which performs only IEEE 802.1X authentication.
(6) If the network authentication protocol identifier is contained in the "username" field (YES), the EAP processing unit 22 notifies the PANA processing unit 23 of the "username" and network authentication protocol identifier (PID) contained in the "username" field (S17). Since the PANA processing unit 23 is notified of the "username", the PANA processing unit 23 can determine that the authentication by IEEE 802.1X is skipped. The PANA processing unit 23 manages an authentication state of the "username" (for example, the PANA processing unit 23 retains the authentication state (authentication is allowed or not) on PANA, and checks whether or not there is a request for PANA authentication from the terminal device having the above described "username" for a certain period.) If a request for PANA authentication (second message) corresponding to the "username" does not arrive from the terminal device for a certain period, the PANA processing unit 23 performs processing of (15) and (16) to be described later.
(7) In addition, if the network authentication protocol identifier is contained in the "username" field (YES in S15), the EAP processing unit 22 instructs the IP filter unit 21 to pass a packet associated with the network authentication protocol identifier, more specifically, a packet required to be passed for receiving PANA authentication (S18). The IP filter unit 21 performs filter setting ("filter setting associated with PID") so as to pass a packet associated with the network authentication protocol identifier (first packet). It is noted that filter setting in step S18 of this procedure is different from filter setting ("filter setting associated with "Identity" ") performed by the PANA processing unit 23 in step S30 and is for passing a packet from the terminal device authorized by PANA authentication (second packet).
(8) In addition, if the network authentication protocol identifier is contained in the "username" field (YES in S15), the EAP processing unit 22 transits the state of the IEEE 802.1X authenticator 24 to the "forceAuthorized" state (from the "auto" state in most cases) (S19). Thereby, the terminal device is always in the authorized state on IEEE 802.1X, so that the terminal device does not have to perform processing about IEEE 802.1X authentication from then on. When the EAP processing unit 22 is not notified that authentication corresponding to the "username" is successful from the PANA processing unit 22 for a certain period, the EAP processing unit 22 performs processing of (15) to be described later (checking of this notification is performed regularly). The case where such notification of successful authentication is not given may be, for example, the case where there is no request for authentication on PANA corresponding to "username" for a certain period, or the case where PANA authentication is not successful, or the case where the terminal device does not perform communication for some reason.

(9) When processing on the "EAP-Response/Identity" (first message) sent from the terminal in step S13 described in (3) is successful, the EAP processing unit 22 notifies the terminal device that the authentication is successful, using an "EAP Success" message through the IEEE 802.1X authenticator 24 (S20, S21).

(10) Receiving the "EAP Success" message, the terminal device acquires an IP address according to DHCP (S22). Alternatively, a user sets an IP address manually.

(11) The terminal device sends a "PANA PCI" (PANA-Client-Initiation) (normal procedure for initial start of PANA) to the authentication agent device, thereby starting PANA authentication (S23).

(12) The PANA processing unit 23 performs EAP processing in cooperation with the EAP processing unit 22 in a PANA authentication phase. An "EAP-Request/Identity" is sent to the terminal device (S24) as in the case of IEEE 802.1X. The "EAP-Response/Identity" (second message) is returned from the terminal device which has received the "EAP-Request/Identity" (S25), and the PANA processing unit 23 checks whether or not the "username" contained in the "username" field of the "EAP-Response/Identity" returned from the terminal device matches the "username" notified from the EAP processing unit 22. If they are not matched, the EAP processing unit 22 sends the "EAP-Response/Identity" to the authentication server (for example, by RADIUS protocol) (S26), and EAP authentication via PANA is performed as in a conventional manner (S27). If they are matched, the EAP processing unit 22 also sends the "EAP-Response/Identity" to the authentication server (S26), and EAP authentication via PANA is performed as in a conventional manner (S27). In addition, if they are matched, the PANA processing unit 23 manages an authentication state of the "username" separately by itself because the authentication state of the "username" is associated with information retained by the EAP processing unit 22.

(13) When PANA authentication at the authentication server is successful (EAP Success) (S28), the PANA processing unit 23 transits into a PANA access phase (success processing flows in the order of: authentication server, EAP processing unit, PANA processing unit, and terminal device (PANA Client)).

Upon transiting into the PANA access phase, the PANA processing unit 23 notifies the EAP processing unit 22 that the authentication is successful (S29). By notifying the success to the EAP processing unit 22, retention of data regarding the "username" by the EAP processing unit 22 is continued. In addition, the PANA processing unit 23, on the occasion of regular transmission of keep-alive packet according to PANA, notifies the EAP processing unit 22 that the "username" is in a state of enabled authentication (authorized).

Further, on this occasion, data regarding the "username" retained by the PANA processing unit 23 itself is continually retained.

In addition, the PANA processing unit 23 instructs the IP filter unit 21 to pass a packet associated with the "username" (second packet) (S30). This may be performed according to an EP (Enforcement Point) control framework of PANA. Upon receiving the notification from the PANA processing unit 23, the IP filter 21 performs filter setting ("filter setting associated with "Identity" ") so as to pass a packet regarding the "username". This allows the terminal device to communicate with the outside, for example, access to a Web server on the Internet.

(14) If PANA authentication associated with the "username" is cancelled (termination), or if authentication fails, or if a PANA session is terminated for some reason, or if an authentication request (second message) is not received from the terminal device for a certain period, the PANA processing unit 23 transits into a PANA termination phase and performs the following processing:

(15)

[1] The PANA processing unit 23 instructs the IP filter unit 21 not to pass a packet associated with the "username" (second packet). In other words, the IP filter unit 21 is requested to cancel the filter setting associated with the "Identity" (S31).

[2] The PANA processing unit 23 notifies the EAP processing unit 22 that the authorization of the "username" is disabled (S32).

[3] The EAP processing unit 22 instructs the IP filter unit 21 not to pass a packet associated with a network authentication protocol identifier (PID) (first packet) (S33).

[4] The EAP processing unit 22 transits the state of the IEEE 802.1X authenticator 24 to the "auto" (from the "force-Authorized" state in most cases) to put the terminal device in a state where IEEE 802.1X authentication (normal authorization or force authorization) is required (S34).

[5] The EAP processing unit 22 notifies the terminal device that the authorization is completely cancelled, using an "EAP-LogOff" message through the IEEE 802.1X authenticator 24 (S35).

[6] After the above processing, the EAP processing unit 22 erases data regarding the "username" retained by itself.

(16) The PANA processing unit 23 erases data regarding the "username" retained by itself.

According to the present embodiment, it is allowed to authenticate in a short time a terminal device that receives authentication according to a certain authentication protocol (for example, EAP) with respect to both the IEEE 802.1X and a higher layer protocol (for example, PANA) defined in a higher layer than a UDP/IP layer or a TCP/IP layer, the certain authentication protocol being operable on both of the IEEE 802.1X and the higher layer protocol.

The above described authentication agent device (authentication device) may be Implemented by using, for example, a general purpose computer device as basic hardware. Thus, the IP filter unit, the EAP processing unit, the PANA processing unit, and the IEEE 802.1X authenticator may be implemented by causing a processor provided in the above described computer device to execute a program. Then, the authentication agent device may be implemented by previously installing the above described program in the computer device or by installing the program in the computer device as needed. The program to be installed may be stored on a recording medium such as a CD-ROM or distributed though a network.

What is claimed is:

1. An authentication device for authenticating a terminal device according to a certain authentication protocol with respect to both an IEEE 802.1X protocol that is defined in a data link layer in a protocol stack and a higher layer protocol that is defined in a higher layer than a UDP(User Datagram Protocol)/IP(Internet Protocol) layer or a TCP(Transmission Control Protocol)/IP(Internet Protocol) layer in the protocol stack, the certain authentication protocol being operable on both of the IEEE 802.1X and the higher layer protocols, comprising:
a first acquisition unit configured to acquire a first message required for the terminal device to be subject to authentication with respect to the IEEE 802.1X protocol, from the terminal device;
a sending-back unit configured to send-back a success message to the terminal device to notify the terminal that the authentication with respect to the IEEE 802.1X protocol is successful without performing IEEE 802.1X protocol authentication when a predetermined authentication identifier is contained in the first message;
a data link establishing unit configured to establish a data link of the data link layer with the terminal device to which the success message has been sent-back;
a filtering unit configured to perform filtering on packets of the UDP/IP or the TCP/IP received from the terminal device through the data link;
a first filter setting unit configured to set the filtering unit so as to pass a first packet required for the terminal device to be subjected to authentication with respect to the higher layer protocol from among the packets from the terminal device and to block second packets different from the first packet, when the authentication identifier is contained in the first message;
a second acquisition unit configured to acquire a second message carried by the first packet from the terminal device, the second message being required for authentication with respect to the higher layer protocol;
an authentication unit configured to authenticate the terminal device from which the second message is acquired, with respect to the higher layer protocol; and
a second filter setting unit configured to set the filtering unit so as to pass second packets from the terminal device when the authentication with respect to the higher layer protocol is successful.

2. The device according to claim 1,
wherein the second acquisition unit waits for arrival of the second message from the terminal device when the authentication identifier is contained in the first message, and
wherein the first filter setting unit sets the filtering unit so as to block the first packet from the terminal device if the second message is not acquired by the second acquisition unit for a certain period.

3. The device according to claim 1, wherein the first filter setting unit sets the filtering unit so as to block the first packet from the terminal device when the authentication by the authentication unit fails.

4. The device according to claim 1, when authentication allowed by the authentication unit for the terminal device is terminated,
the second filter setting unit sets the filtering unit so as to block second packets from the terminal device, and
the first filter setting unit sets the filtering unit so as to block the first packet from the terminal device.

5. The device according to claim 1,
wherein the authentication unit authenticates the terminal device which has sent the first message with respect to the IEEE 802.1X protocol when the authentication identifier is not contained in the first message acquired by the first acquisition unit, and
wherein the sending-back unit sends-back the success message to notify that the authentication with respect to the IEEE 802.1X protocol is successful to the terminal device when the authentication with respect to the IEEE 802.1X protocol by the authentication unit is successful.

6. The device according to claim 5, wherein the authentication unit performs the authentication with respect to the higher layer protocol and the authentication with respect to the IEEE 802.1X protocol by utilizing an authentication server which performs authentication based on the certain authentication protocol.

7. The device according to claim 1, wherein the certain authentication protocol is EAP (Extensible Authentication protocol).

8. The device according to claim 1, wherein the higher layer protocol is PANA (Protocol for Carrying Authentication For Network Access).

9. An authentication method for authenticating a terminal device according to a certain authentication protocol with respect to both an IEEE 802.1X protocol that is defined in a data link layer in a protocol stack and a higher layer protocol that is defined in a higher layer than a UDP/IP layer or a TC/IP layer in the protocol stack, the certain authentication protocol being operable on both of the IEEE 802.1X and the higher layer protocols, comprising:
acquiring a first message required for the terminal device to be subject to authentication with respect to the IEEE 802.1X protocol, from the terminal device;
when a predetermined authentication identifier is contained in the first message acquired from the terminal device, sending-back to the terminal device a success message to notify the terminal device that the authentication with respect to the IEEE 802.1X protocol is successful without performing IEEE 802.1X protocol authentication;
establishing a data link of the data link layer with the terminal device to which the success message has been sent-back;
filtering packets of the UDP/IP or the TCP/IP received from the terminal device through the data link, using a filtering unit which filters the packets;
when the authentication identifier is contained in the first message, setting the filtering unit so as to pass a first packet required for the terminal device to be subjected to authentication with respect to the higher layer protocol from among the packets sent from the terminal device and to block second packets different from the first packet;
acquiring a second message carried by the first packet by the filtering unit from the terminal device, the second message being required for the terminal device to be subject to authentication with respect to the higher layer protocol;
authenticating the terminal device from which the second message is acquired with respect to the higher layer protocol; and
when the authentication with respect to the higher layer protocol is successful, setting the filtering unit so as to pass the second packets sent from the terminal device.

10. A non-transitory computer readable medium storing an authentication program for authenticating a terminal device according to a certain authentication protocol with respect to both an IEEE 802.1X protocol that is defined in a data link layer in a protocol stack and a higher layer protocol that is defined in a higher layer than a UDP/IP layer or a TC/IP layer in the protocol stack, the certain authentication protocol being operable on both of the IEEE 802.1X protocol and the higher layer protocol, the program causing a computer to execute the steps of:

acquiring a first message required for the terminal device to be subject to authentication with respect to the IEEE 802.1X protocol, from the terminal device;

when a predetermined authentication identifier is contained in the first message acquired from the terminal device, sending-back to the terminal device a success message to notify the terminal device that the authentication with respect to the IEEE 802.1X protocol is successful without performing IEEE 802.1X protocol authentication;

establishing a data link of the data link layer with the terminal device to which the success message has been sent-back;

filtering packets of the UDP/IP or the TCP/IP received from the terminal device through the data link, using a filtering unit which filters the packets;

when the authentication identifier is contained in the first message, setting the filtering unit so as to pass a first packet required for the terminal device to be subjected to authentication with respect to the higher layer protocol from among the packets sent from the terminal device and to block second packets different from the first packet;

acquiring a second message carried by the first packet by the filtering unit from the terminal device, the second message being required for the terminal device to be subject to authentication with respect to the higher layer protocol;

authenticating the terminal device from which the second message is acquired with respect to the higher layer protocol; and when the authentication with respect to the higher layer protocol is successful, setting the filtering unit so as to pass the second packets sent from the terminal device.

11. A network access authentication system having a terminal device which receives authentication according to a certain authentication protocol with respect to both an IEEE 802.1X protocol that is defined in a data link layer in a protocol stack and a higher layer protocol that is defined in a higher layer than a UDP(User Datagram Protocol)/IP(Internet Protocol) layer or a TCP(Transmission Control Protocol)/IP(Internet Protocol) layer in the protocol stack, the certain authentication protocol being operable on both of the IEEE 802.1X protocol and the higher layer protocol, the authentication device comprising:

a first acquisition unit configured to acquire a first message required for the terminal device to be subject to authentication with respect to the IEEE 802.1X protocol, from the terminal device;

a sending-back unit configured to send-back a success message to the terminal device to notify the terminal that the authentication with respect to the IEEE 802.1X protocol is successful without performing IEEE 802.1X protocol authentication when a predetermined authentication identifier is contained in the first message;

a data link establishing unit configured to establish a data link of the data link layer with the terminal device to which the success message has been sent-back;

a filtering unit configured to perform filtering on packets of the UDP/IP or the TCP/IP received from the terminal device through the data link;

a first filter setting unit configured to set the filtering unit so as to pass a first packet required for the terminal device to be subjected to authentication with respect to the higher layer protocol from among the packets from the terminal device and to block second packets different from the first packet, when the authentication identifier is contained in the first message;

a second acquisition unit configured to acquire a second message carried by the first packet from the terminal device, the second message being required for authentication with respect to the higher layer protocol;

an authentication unit configured to authenticate the terminal device from which has the second message is acquired, with respect to the higher layer protocol; and a second filter setting unit configured to set the filtering unit so as to pass second packets from the terminal device when the authentication with respect to the higher layer protocol is successful, the terminal device comprising;

a transmitting unit configured to transmit the first message required for the terminal device to be subjected to the authentication with respect to the IEEE 802.1X protocol, including the predetermined authentication identifier to the authentication device.

12. An authentication device for authenticating a terminal device according to a certain authentication protocol with respect to both a Link Layer Authentication Protocol that is defined in a data link layer in a protocol stack and a higher layer protocol that is defined in a higher layer than a UDP (User Datagram Protocol)/IP(Internet Protocol) layer or a TCP(Transmission Control Protocol)/IP(Internet Protocol) layer in the protocol stack, the certain authentication protocol being operable on both of the Link Layer Authentication Protocol and the higher layer protocols, comprising:

a first acquisition unit configured to acquire a first message required for the terminal device to be subject to authentication with respect to the Link Layer Authentication Protocol, from the terminal device;

a sending-back unit configured to send-back a success message to the terminal device to notify the terminal that the authentication with respect to the Link Layer Authentication Protocol is successful without performing Link Layer Authentication Protocol authentication when a predetermined authentication identifier is contained in the first message;

a data link establishing unit configured to establish a data link of the data link layer with the terminal device to which the success message has been sent-back;

a filtering unit configured to perform filtering on packets of the UDP/IP or the TCP/IP received from the terminal device through the data link;

a first filter setting unit configured to set the filtering unit so as to pass a first packet required for the terminal device to be subjected to authentication with respect to the higher layer protocol from among the packets from the terminal device and to block second packets different from the first packet, when the authentication identifier is contained in the first message;

a second acquisition unit configured to acquire a second message carried by the first packet from the terminal device, the second message being required for authentication with respect to the higher layer protocol;

an authentication unit configured to authenticate the terminal device from which has the second message is acquired, with respect to the higher layer protocol; and a second filter setting unit configured to set the filtering unit so as to pass second packets from the terminal device when the authentication with respect to the higher layer protocol is successful.

13. A device for communicating with a terminal device to be subjected to authentication according to a certain authentication protocol with respect to both a Link Layer Authentication Protocol defined in a data link layer in a protocol stack and a higher layer protocol defined in a higher layer than a UDP(User Datagram Protocol)/IP(Internet Protocol) layer or a TCP(Transmission Control Protocol)/IP(Internet Protocol) layer in the protocol stack, the certain authentication protocol being operable on both of the Link Layer Authentication Protocol and the higher layer protocol, comprising:

a first acquisition unit configured to acquire a first message required for the terminal device to be subjected to authentication with respect to the Link Layer Authentication Protocol, from the terminal device;

a sending-back unit configured to send-back a success message to the terminal device to notify the terminal device that the authentication with respect to the Link Layer Authentication Protocol is successful without performing Link Layer Authentication Protocol authentication;

a data link establishing unit configured to establish a data link of the data link layer with the terminal device to which the success message has been sent-back;

a filtering unit configured to perform filtering on packets of the UDP/IP or the TCP/IP received through the data link from the terminal device;

a first filter setting unit configured to set the filtering unit so as to pass a first packet required for the terminal device to be subjected to authentication with respect to the higher layer protocol and to block second packets different from the first packet among the packets, when the authentication identifier is contained in the first message;

a second acquisition unit configured to acquire a second message carried by the first packet from the terminal device, the second message being required for the terminal device to be subjected to authentication with respect to the higher layer protocol;

an authentication request unit configured to, based on the second message, send to an authentication device a request message to request authenticating the terminal device with respect to the higher layer protocol, the authentication device performing authentication with respect to the higher layer protocol; and a second filter setting unit configured to set the filtering unit so as to pass the second packets from the terminal device when the authentication by the authentication device is successful.

14. A non-transitory computer readable medium storing a program for communicating with a terminal device to be subjected to authentication according to a certain authentication protocol with respect to both a Link Layer Authentication Protocol that is defined in a data link layer in a protocol stack and a higher layer protocol that is defined in a higher layer than a UDP/IP layer or a TC/IP layer in the protocol stack, the certain authentication protocol being operable on both of the Link Layer Authentication Protocol and the higher layer protocol, the program causing a computer to execute the steps of:

acquiring a first message required for the terminal device to be subject to authentication with respect to the Link Layer Authentication Protocol, from the terminal device;

when a predetermined authentication identifier is contained in the first message acquired from the terminal device, sending-back to the terminal device a success message to notify the terminal device that the authentication with respect to the Link Layer Authentication Protocol is successful without performing Link Layer Authentication Protocol authentication;

establishing a data link of the data link layer with the terminal device to which the success message has been sent-back;

filtering packets of the UDP/IP or the TCP/IP received from the terminal device through the data link, using a filtering unit which filters the packets;

when the authentication identifier is contained in the first message, setting the filtering unit so as to pass a first packet required for the terminal device to be subjected to authentication with respect to the higher layer protocol from among the packets sent from the terminal device and to block second packets different from the first packet;

acquiring a second message carried by the first packet by the filtering unit from the terminal device, the second message being required for the terminal device to be subject to authentication with respect to the higher layer protocol;

sending, based on the second message, to a authentication device a request message to request authenticating the terminal device with respect to the higher layer protocol, the authentication device performing authentication with respect to the higher layer protocol; and setting the filtering unit so as to pass the second packets sent from the terminal device when the authentication by the authentication device is successful.

* * * * *

UNITED STATES PATENT AND TRADEMARK OFFICE
CERTIFICATE OF CORRECTION

| | | |
|---|---|---|
| PATENT NO. | : 8,286,224 B2 | Page 1 of 1 |
| APPLICATION NO. | : 12/188262 | |
| DATED | : October 9, 2012 | |
| INVENTOR(S) | : Esaka et al. | |

It is certified that error appears in the above-identified patent and that said Letters Patent is hereby corrected as shown below:

Claim 11, column 16, line 17, change "has the" to --the--.

Signed and Sealed this
Fifteenth Day of January, 2013

David J. Kappos
*Director of the United States Patent and Trademark Office*